US012608339B1

(12) United States Patent
Gupta et al.

(10) Patent No.: US 12,608,339 B1
(45) Date of Patent: Apr. 21, 2026

(54) SYSTEM AND METHOD FOR MANAGING IMAGES IN A DECENTRALIZED FILE SYSTEM BASED ON IMAGE METADATA IN A BLOCKCHAIN

(71) Applicant: Bank of America Corporation, Charlotte, NC (US)

(72) Inventors: Saurabh Gupta, New Delhi (IN); Amit Bhandari, Uttarakhand (IN); Neetu Kalra, Haryana (IN); Angel ., Himachal Pradesh (IN); Riya Sharma, Uttar Pradesh (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/040,641

(22) Filed: Jan. 29, 2025

(51) Int. Cl.
| | |
|---|---|
| *G06F 16/13* | (2019.01) |
| *G06F 16/11* | (2019.01) |
| *G06F 16/182* | (2019.01) |
| *H04L 67/1097* | (2022.01) |

(52) U.S. Cl.
CPC .......... *G06F 16/137* (2019.01); *G06F 16/116* (2019.01); *G06F 16/183* (2019.01); *H04L 67/1097* (2013.01)

(58) Field of Classification Search
CPC .... G06F 16/137; G06F 16/183; G06F 16/116; H04L 67/1097
See application file for complete search history.

(56) References Cited

U.S. PATENT DOCUMENTS

| | | | |
|---|---|---|---|
| 10,952,794 | B2 | 3/2021 | Villongco |
| 11,232,553 | B2 | 1/2022 | Parikh et al. |
| 11,288,865 | B2 | 3/2022 | Haslam et al. |
| 11,497,557 | B2 | 11/2022 | Haslam et al. |
| 11,768,504 | B2 | 9/2023 | Afrouzi et al. |
| 11,769,159 | B2 | 9/2023 | Chaudhuri |
| 11,785,004 | B2 | 10/2023 | Soon-Shiong et al. |
| 11,927,965 | B2 | 3/2024 | Afrouzi et al. |
| 11,961,624 | B2 | 4/2024 | Smurro |
| 12,080,024 | B2 | 9/2024 | Arksey et al. |
| 2013/0314429 | A1* | 11/2013 | Croxford ............... G09G 5/393 345/531 |
| 2019/0065763 | A1 | 2/2019 | Berg |
| 2019/0354694 | A1* | 11/2019 | Azoulay ............... H04L 9/0637 |
| 2019/0355483 | A1 | 11/2019 | Smurro |
| 2020/0162266 | A1 | 5/2020 | Miller et al. |
| 2020/0351075 | A1* | 11/2020 | Griffin .................. H04L 9/0894 |
| 2021/0248283 | A1 | 8/2021 | Kincart et al. |
| 2021/0287322 | A1* | 9/2021 | Yaffe ..................... H04L 9/3247 |

(Continued)

*Primary Examiner* — William P Bartlett

(57) ABSTRACT

A system to manage images that are representative of network data packets in a decentralized file system based on image metadata stored in a blockchain network is disclosed. The system accesses an image that is generated based on data packets and generates a hash value for the image based on timestamp associated with the data packets and a compression level used to compress the data packets. The system generates a content identifier (CID) for the image based on the content of the data packets. The system generates metadata in a specific structured data format based on the generated hash value and the CID. The system associates the generated metadata to the image, communicates the metadata to a blockchain network for referencing the image, and communicates the image to a decentralized file system.

20 Claims, 3 Drawing Sheets

(56) References Cited

U.S. PATENT DOCUMENTS

| | | | | |
|---|---|---|---|---|
| 2022/0140840 A1* | 5/2022 | Wang | .................... | G06F 16/583 |
| | | | | 707/693 |
| 2022/0187841 A1 | 6/2022 | Afrouzi et al. | | |
| 2022/0187847 A1 | 6/2022 | Cella et al. | | |
| 2022/0245574 A1 | 8/2022 | Cella et al. | | |
| 2023/0044294 A1 | 2/2023 | Aravamudan et al. | | |
| 2023/0341850 A1 | 10/2023 | Cella et al. | | |
| 2024/0185592 A1 | 6/2024 | Yang et al. | | |
| 2025/0070987 A1* | 2/2025 | Gupta | ...................... | H04L 9/50 |
| 2025/0106052 A1* | 3/2025 | Tanaka | ................. | H04L 9/3239 |

\* cited by examiner

300

SYSTEM AND METHOD FOR MANAGING IMAGES IN A DECENTRALIZED FILE SYSTEM BASED ON IMAGE METADATA IN A BLOCKCHAIN

TECHNICAL FIELD

The present disclosure relates generally to image generation, and more specifically to a system and method for managing images in a decentralized file system based on image metadata in a blockchain.

BACKGROUND

In wireless communication, data packets are communicated among computing devices. Each data packet may include a payload or content. Blockchain may be used to store and maintain data packets.

SUMMARY

The disclosed system, described in the present disclosure, is particularly integrated into practical applications to provide technological improvements to conventional techniques for generating, managing, and processing image metadata.

In some conventional systems, blockchain networks may be used to store information. However, in the case of images that are visual representations of data packets, the size of each image may grow as new data packets are processed and new pixels are generated and added to the image. Thus, it is challenging to efficiently manage the storage and retrieval of images with dynamically growing sizes. Further, to reference and identify an image, certain information, such as hash values, is generated. However, such information may be in a different data format compared to each other or maybe unstructured. It is challenging to use incompatible and/or unstructured data to reference and identify a respective image.

The disclosed system is configured to provide a technical solution to these and other technical problems in the current techniques. The technical advantages and improvements over the conventional techniques are described below in conjunction with certain embodiments of the disclosed system.

In some embodiments, the disclosed system implements a blockchain network as a middleware to store image metadata and use the metadata to identify each respective image stored in the decentralized file system. This, in turn, provides the security and immutability features for the metadata by leveraging the blockchain network and the scalability feature for storing growing images by leveraging the decentralized file system.

In some embodiments, the disclosed system generates image metadata for each image by transforming a hash value and content identifier (CID) of the image into a desired structured data format that is compatible with the downstream computing devices that would receive and are expected to process and analyze the metadata. For example, in conventional systems, certain computing devices may be given metadata in a data format that is not compatible with the receiving computing devices. This leads to the inability to process and analyze the received metadata. For example, if the receiving software application at a receiving computing device is designed/configured to process metadata in a JavaScript Object Notation (JSON) format but receives metadata in an Extensible Markup Language (XML) format, the receiving software application may fail to parse the metadata correctly as intended. This may lead to delays and errors in the downstream computing devices that are waiting to receive the processed metadata. Further, such issues may need additional processing and memory resources to address and mitigate. The disclosed system is configured to transform the input data that may be unstructured or have incompatible data structures with each other and/or the receiving software application into a desired data format that is compatible with the receiving software application. Thus, the software application at the receiving computing device may be able to process and analyze the received transformed metadata. This, in turn, provides the technical advantage of transforming disparate and unstructured/incompatible data into a unified data format, which improves the compatibility of the underlying systems. Continuing the above example regarding the receiving software application being configured to process metadata in JSON format but receiving metadata in XML format—which leads to incompatibility between the receiving software application and the XML metadata—by implementing the solution provided by the disclosed system, the metadata is proactively transformed from XML format into JSON format before it is transmitted to the receiving software application. Therefore, the incompatibility problem between the metadata and the receiving software application is mitigated, and this improves the compatibility of the underlying systems. More specifically, the underlying technology to implement compatibility and interoperability among different systems that are configured to operate on different data formats (e.g., JSON, XML, etc.) is improved by transforming disparate and unstructured/incompatible data into a unified data format. This also leads to more seamless data communication without interruptions between the systems because each system is able to receive, process, and analyze the metadata in a compatible format, which reduces errors in analyzing the metadata, that would otherwise occur if the receiving system would receive the metadata in a data format which the receiving system is not compatible. Accurate metadata allows for more efficient data processing and retrieval, reducing computational overhead and latency. This increase in optimization is helpful when dealing with large volumes of data, as it allows for systems to scale effectively without performance degradation. Faster data access and retrieval times can be important for analytics and operational responsiveness.

The interoperability achieved, as described above, also reduces the need for middleware or adapters, which simplifies the architecture and reduces potential points of failure. As a result, the overall system becomes more resilient and easier to maintain. Additionally, with compatible data, issues such as missing values, duplicates, and inconsistencies are reduced, leading to more reliable and complete datasets. A high-quality data can be important for various analytics, reporting and decision-making operations. Furthermore, data compatibility facilitates the implementation of robust data validation and cleansing processing, increasing the likelihood that any anomalies are detected and rectified. Thus, the disclosed system provides improved data integrity and accuracy, enhanced data integration and interoperability, improved performance and scalability, and enhanced data quality and reliability.

In some embodiments, a system comprises a memory operably coupled with a processor. The memory is configured to store a first image from among the one or more images comprises a plurality of pixels visually representing a plurality of data packets. Each pixel from among the plurality of pixels represents a respective one or more data packets. The processor is configured to determine a timestamp that indicates when the plurality of data packets was communicated in a network. The processor is further configured to determine a compression level associated with the plurality of data packets, wherein the compression level indicates a number of levels used to identify, in a recursive compression process, repeating structures within the plurality of data packets. The processor is further configured to generate a first hash value for the first image based at least in part upon the determined timestamp and the determined compression level, wherein the generated first hash value represents a combination of the determined timestamp and the determined compression level. The processor is further configured to generate a first unique content identifier (CID) for the first image based at least in part upon content within the plurality of data packets, wherein the first CID indicates a location data associated with the first image within a decentralized file system. The processor is further configured to generate a first metadata for the first image, wherein the generated first metadata represents the generated first hash value and the generated first CID in a structured data format. The processor is further configured to associate the generated first metadata to the first image. The processor is further configured to communicate the generated first metadata to a block in a blockchain network. The processor is further configured to communicate the first image to the decentralized file system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
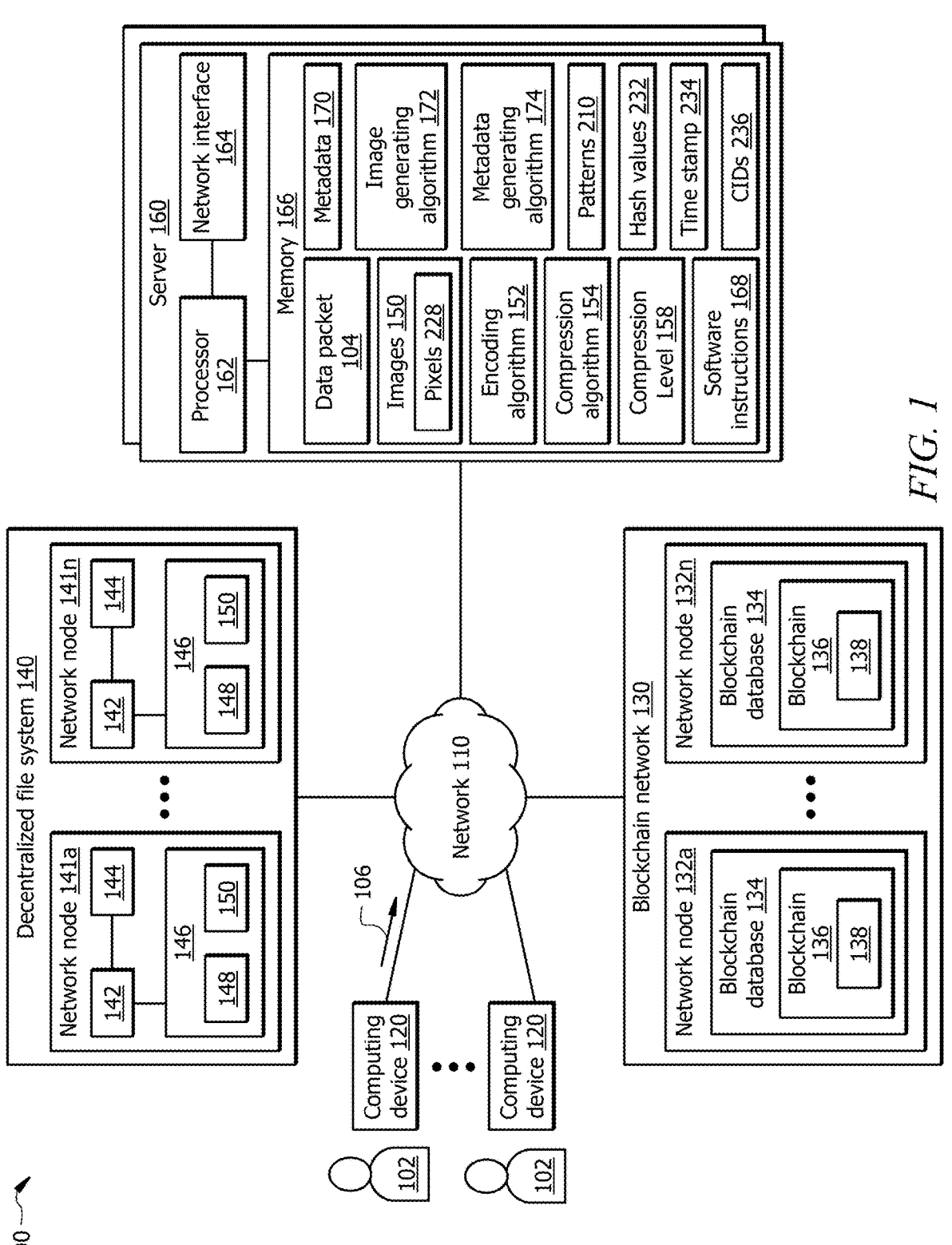
FIG. 1 illustrates an embodiment of a system configured to generate and manage images that are representative of network data packets in a decentralized file system based on image metadata stored in a blockchain network.
Figure 2:
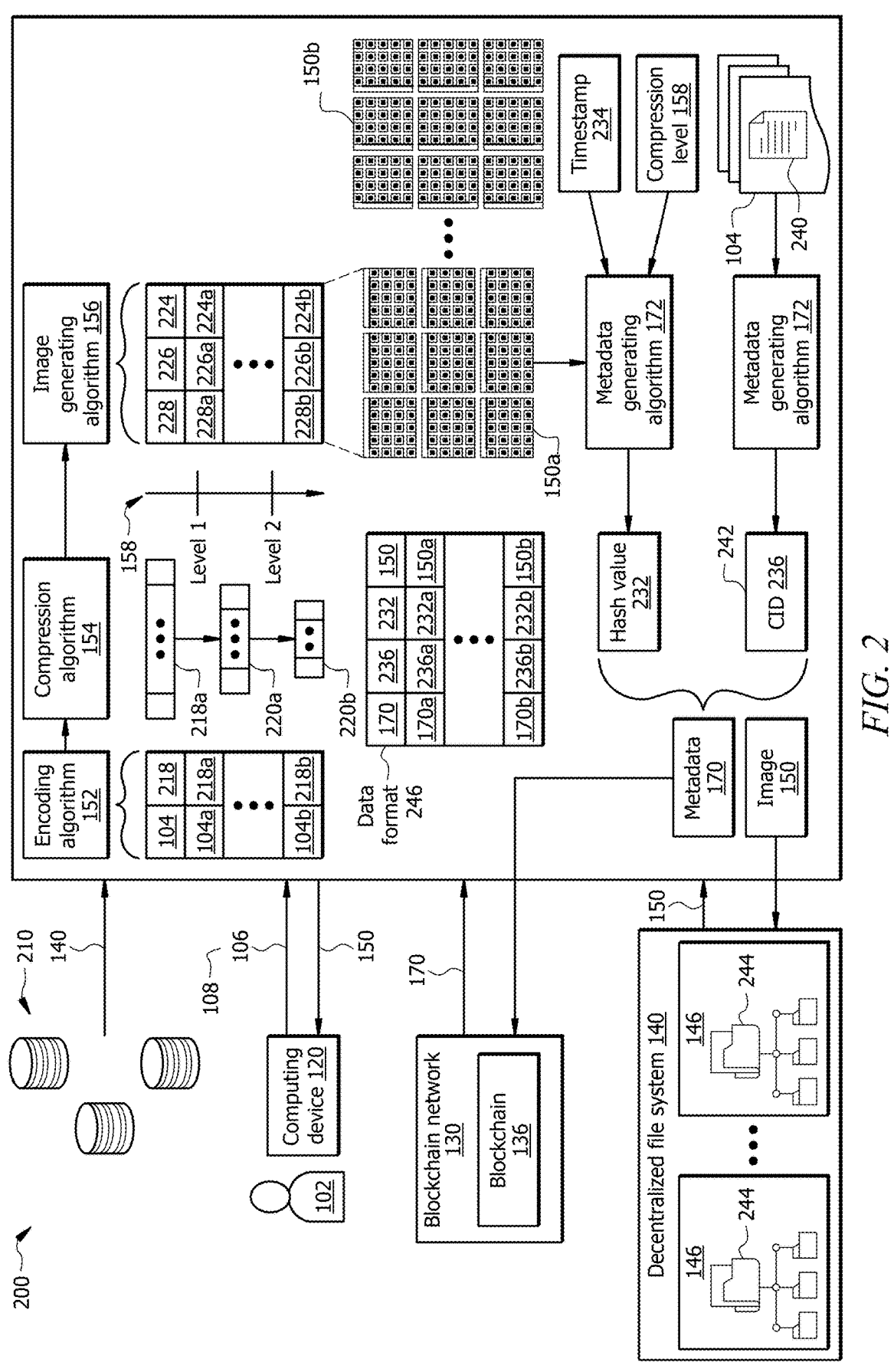
FIG. 2 illustrates an example operational flow of the system of FIG. 1 to manage images that are representative of network data packets in a decentralized file system based on image metadata stored in a blockchain network.
Figure 3:
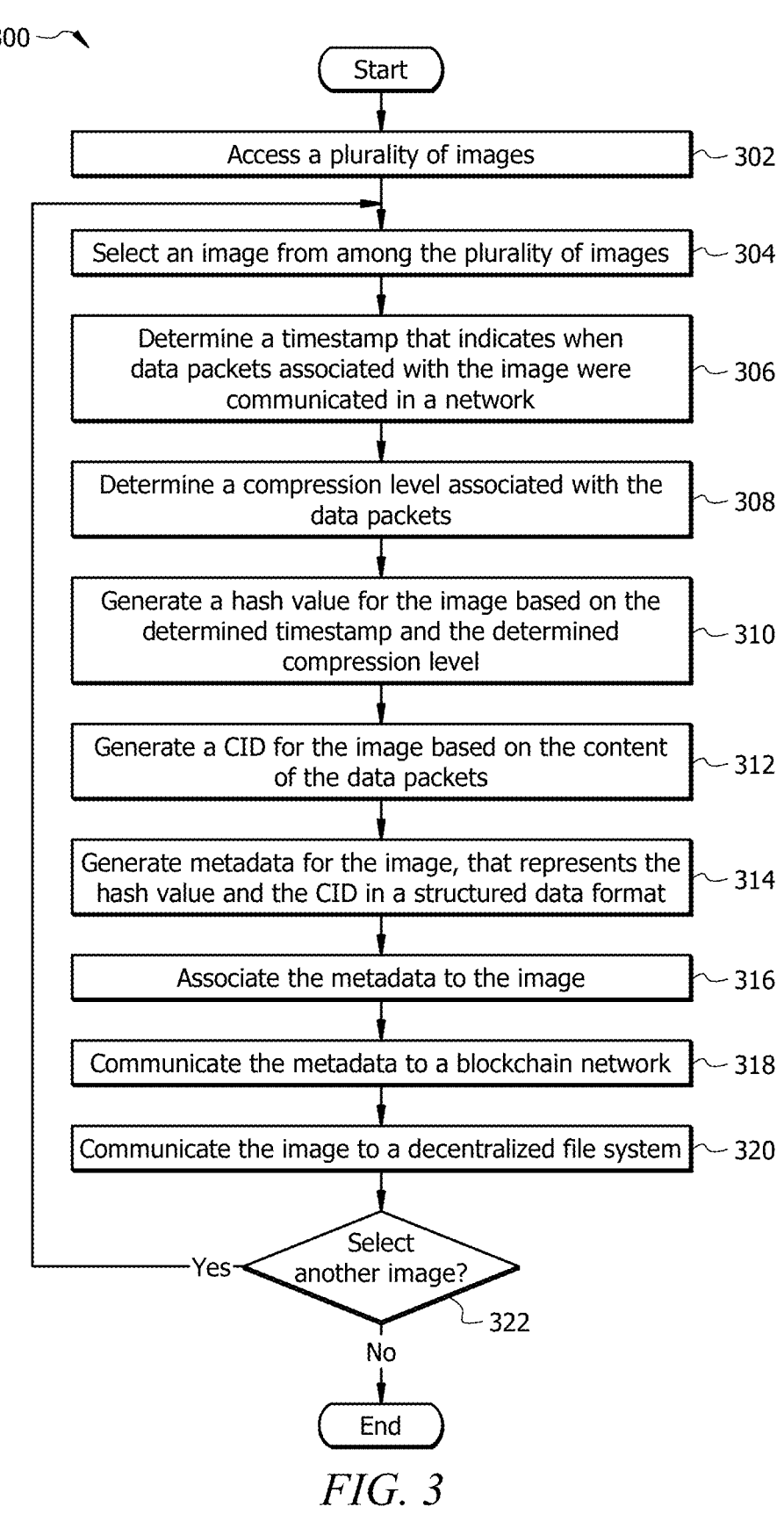
FIG. 3 illustrates an example flow chart of a method of the system of FIG. 1 to manage images that are representative of network data packets in a decentralized file system based on image metadata stored in a blockchain network.

As described above, previous technologies fail to provide efficient and reliable solutions to manage images that are representative of network data packets in a decentralized file system based on image metadata stored in a blockchain network. Embodiments of the present disclosure and its advantages may be understood by referring to FIGS. 1 through 3. FIGS. 1 through 3 are used to describe systems and methods to manage images that are representative of network data packets in a decentralized file system based on image metadata stored in a blockchain network, according to some embodiments.

System Overview

FIG. 1 illustrates an embodiment of a system 100 that is generally configured to generate and manage images 150 that are representative of encoded and compressed network data packets 104 in a decentralized file system 140 based on image metadata 170 stored in a blockchain network 130. In some embodiments, the system 100 comprises a server 160 communicatively coupled with one or more computing devices 120, a blockchain network 130, and a decentralized file system 140 via a network 110. The network 110 enables the communication among the components of the system 100. Each of the computing devices 120 may be used to communicate with other components of the system 100. The decentralized file system 140 may store the images 150 generated by the server 160. The blockchain network 130 may store the metadata 170 associated with the images 150 and be used as a middleware to set access control for the images 150. The server 160 may be configured to encode and compress network data packets 104, transform each encoded, compressed network data packet 104 into a respective pixel 228, where the attributes of the data packet 104 are embedded into the respective pixel 228, and generate an image 150 with the generated pixels 228, where the image 150 visually represents trends of data packets 104 with respect to time, generate metadata 170 for each image 150, where the metadata 170 includes a hash value 232 and content identifier (CID) 236 for the image 150. In other embodiments, system 100 may not have all of the components listed and/or may have other elements instead of, or in addition to, those listed above.

In general, the disclosed system 100 provides technological improvements to conventional techniques for generating, managing, and processing image metadata 170 by transforming unstructured data (including the hash value 232 and CID 236 of an image 150) into a desired structured data format. The disclosed system 100 further provides improvements to conventional techniques for managing, storing, and retrieving images 150 with dynamic sizes by leveraging features from blockchain networks 130 and decentralized file systems 140.

In some conventional systems, blockchain networks may be used to store information. However, in the case of images 150 that are visual representations of data packets 104, the size of each image 150 may grow as new data packets 104 are processed and new pixels 228 are generated and added to the image 150. Thus, it is challenging to efficiently manage the storage and retrieval of images 150 with dynamically growing sizes. Further, to reference and identify an image 150, certain information, such as hash values are generated. However, such information may be in a different data format compared to each other or maybe unstructured. It is challenging to use incompatible and/or unstructured data to reference and identify a respective image 150.

The disclosed system 100 is configured to provide a technical solution to these and other technical problems in the current techniques. The technical advantages and improvements over the conventional techniques are described below in conjunction with certain embodiments of the disclosed system.

In some embodiments, the disclosed system 100 implements a blockchain network 130 as a middleware to store image metadata 170 and use the metadata 170 to identify each respective image 150 stored in the decentralized file system 140. This, in turn, provides the security and immutability features for the metadata 170 by leveraging the blockchain network 130 and the scalability feature for storing growing images 150 by leveraging the decentralized file system 140.

In some embodiments, the disclosed system 100 generates an image metadata 170 for each image 150 by transforming a hash value 232 and CID 236 of the image 150 into a desired structured data format that is compatible with the downstream computing devices (e.g., network nodes 132*a*-*n*) that would receive and expected to process and analyze the metadata 170. For example, in conventional systems, certain computing devices may be given metadata in a data format that is not compatible with the receiving computing devices. This leads to the inability to process and analyze the received metadata. For example, if the receiving software application at the receiving computing device is designed to process metadata in a JavaScript Object Notation (JSON) format but receives metadata in an Extensible Markup Language (XML) format, the receiving software application may fail to parse the metadata correctly as intended. This may lead to delays and errors in the downstream computing devices that are waiting to receive the processed metadata. Further, such issues may need additional processing and memory resources to address and mitigate. The disclosed system 100 is configured to transform the input data that may be unstructured or have incompatible data structures with each other and/or the receiving software application into a desired data format that is compatible with the receiving software application. Thus, the software application at the receiving computing device may be able to process and analyze the received transformed metadata. This, in turn, provides the technical advantage of transforming disparate and unstructured/incompatible data into a unified data format, which improves the compatibility of conventional systems.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., Wi-Fi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may include fiber optics, optical fibers, and the like to implement quantum communication channels. The network 110 may be configured to support any suitable type of communication protocol as would be appreciated by one of ordinary skill in the art.

Example Computing Device

Each computing device 120 may generally be any device that is configured to process data and interact with users. Examples of the computing device 120 include, but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, kiosks, automated teller machines, or any other suitable type of device. The computing device 120 may include a user interface, such as a display, a microphone, a camera, a keypad, or other appropriate terminal equipment usable by users.

Each computing device 120 may include a hardware processor, memory, and/or circuitry configured to perform any of the functions or actions of the computing device 120 described herein. For example, the computing device 120 includes a processor in signal communication with a network interface and a memory. The memory stores software instructions (e.g., code) that, when executed by the processor, cause the processor to perform one or more operations of the computing device 120 described herein.

The users 102 may use the computing devices 120 to communicate data packets 104 with other computing devices 120, entities, organizations that provide certain services to their users, etc. In some examples, a data packet 104 may include headers to indicate network path, network protocols, content (payload), etc. Some examples of the users 102 may include people, organizations, among others. In some examples, a user 102 associated with an organization may send a request 106 to the server 160 to encode and compress a set of data packets 104 associated with the users of the organization and generate an image 150 to represent the data packets 104. In response to the request 106, the server 160 may initiate the requested operations. In some examples, a user 102 may send a request 106 to retrieve an image 150 from the decentralized file system 140. In response, the server 160 may perform certain operations to verify the authorization of the user 102 and if it is determined that the user 102 is authorized to receive the image 150, identify the image 150 based on its metadata 170, retrieve the image 150, and communicate the image 150 to the requesting computing device 120 from which the request 106 is received. These operations are described in conjunction with FIG. 2 in greater detail.

Blockchain Network

The blockchain network 130 is a peer-to-peer network of network nodes, and is generally configured to distribute image metadata 170 (and any other data/information) among the network nodes 132*a*-*n*. In certain embodiments, the blockchain network 130 is a distributed database in a network of network nodes 132*a*-*n*. In certain embodiments, blockchain network 130 may be a public blockchain network. In certain embodiments, blockchain network 130 may be a private blockchain network. For example, membership in blockchain network 130 may be limited to nodes registered as belonging to and/or affiliated with the organization to which the server 160 belongs. In certain embodiments, the server 160 may be a member of blockchain network 130 (e.g., as nodes among nodes 132*a*-*n* in blockchain network 130).

The blockchain network 130 may comprise any number of network nodes 132*a*-*n* to form a distributed network that maintains a blockchain 136. Each network node 132 may comprise a computing device, a virtual machine, a server, a workstation, and/or the like. Each network node 132*a* through 132*n* of blockchain network 130 stores a blockchain database 134 that is configured to store a copy of a blockchain 136. Each network node 132*a* through 132*n* may be an instance of a network node 132. The network node 132 may include a hardware processor, memory, and/or circuitry (not explicitly shown) configured to perform any of the functions or actions of the network node 132 described herein. For example, a software application designed using software code may be stored in the memory and executed by the processor to perform the functions of the network node 132. The network node 132 is configured to communicate with other devices and components of the system 100 via the network 110.

In certain embodiments, the server 160 may access the blockchain network 130 via the network 110 to store and retrieve image metadata 170 associated with images 150. The server 160 may use an application programming interface (API) service to interact with the blockchain network 130 and other components of the system 100. The blockchain network 130 is configured to distribute metadata 170 among the nodes 132a-n, such that the metadata is secure and immutable.

The blockchain network 130 is configured to establish consensus among the network nodes 132a-n about the present state of the blockchain database 134. For example, each network node 132a-n comprises a processor in signal communication with a memory storing software instructions that when executed by the processor, cause the network nodes 132a-n to implement a consensus protocol procedure through which all the network nodes 132a-n of the blockchain network 130 reach a common agreement about the present state of the blockchain database 134. In this way, each network node 132a-n achieves reliability in the blockchain network 130 and establishes trust between the network nodes 132a-n in a distributed computing environment. Essentially, the consensus protocol makes sure that every new block that is added to the blockchain 136 is the one and only version of the truth that is agreed upon by all the blocks in the blockchain 136, which represents an accurate and tamper-proof record of metadata 170. For example, every new metadata 170 entry for an image 150 results in the creation of a new block in the blockchain 136. Each block in the blockchain 136 is linked to the previous block to maintain a secure and traceable chain of data.

The blockchain 136 links together blocks of data, which store identifiable units called blockchain data entries. For example, blockchain data entries may include metadata 170 that represents a hash value 232, CID 236, and/or additional information associated with the corresponding image 150 received from the server 160. Each metadata 170 may be associated with a different image 150. The metadata 170 may be formatted as structured data, such as JSON or XML, to facilitate compatibility with the blockchain network 130 and other devices of the system 100. Every new image 150 processed by the server 160 results in a new metadata entry added as a new block to the blockchain 136.

Decentralized File System

The decentralized file system 140 is generally a distributed storage network of databases configured to store images 150 that represent encoded and compressed network data packets 104. In certain embodiments, the decentralized file system 140 may be a peer-to-peer architecture that comprises a plurality of network nodes 141a-n to provide distributed storage and retrieval of images 150. For example, the decentralized file system 140 may include a cluster of network nodes 141a-n in a distributed network. The decentralized file system 140 may comprise any number of network nodes 141a-n to form a distributed network to adapt to every growing image 150. For example, each network nodes 141a-n may comprise a computing device, a virtual machine, a server, a workstation, and/or the like.

Each network node 141a-n may be an instance of a network node 132. The network node 132 (e.g., any of network node 141a-n) may comprise a processor 142 operably coupled with a network interface 144 and a memory 146. The processor 142 comprises one or more processors. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 may register the supply operands to the ALU and store the results of ALU operations. The processor 142 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 148) to perform the operations of the network node 132 described herein. In this way, the processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more operations of the operational flow 200 as described in FIG. 2 and one or more operations of the method 300 as described in FIG. 3.

The network interface 144 is configured to enable wired and/or wireless communications. The network interface 144 may be configured to communicate data between the network node 132 and other devices, systems, or domains. For example, the network interface 144 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 142 may be configured to send and receive data using the network interface 144. The network interface 144 may be configured to use any suitable type of communication protocol.

The memory 146 may be a non-transitory computer-readable medium. The memory 146 may be volatile or non-volatile and may comprise read-only memory (ROM), random-access memory (RAM), ternary content-addressable memory (TCAM), dynamic random-access memory (DRAM), and/or static random-access memory (SRAM). The memory 146 may include one or more of a local database, a cloud database, a network-attached storage (NAS), etc. The memory 146 comprises one or more disks, tape drives, or solid-state drives, and may be used as an overflow data storage device, to store programs when such programs are selected for execution, and to store instructions and data that are read during program execution. The memory 146 may store any of the information described in FIGS. 1-3 along with any other data, instructions, logic, rules, or code operable to implement the function(s) described herein when executed by processor 142. For example, the memory 146 may store software instructions 148, images 150, and/or any other data or instructions. The software instructions 148 may comprise any suitable set of instructions, logic, rules, or code operable to execute the processor 142 and perform the functions described herein, such as some or all of those described in FIGS. 1-3.

Server

The server 160 generally includes a hardware computer system configured to encode and compress network data packets 104, and transform each encoded, compressed network data packet 104 into a respective pixel 228, where the attributes of the data packet 104 are embedded into the respective pixel 228, and generate an image 150 with the generated pixels 228, where the image 150 visually represents trends of data packets 104 with respect to time, generate metadata 170 for each image 150, where the metadata 170 includes a hash value 232 and CID 236 for the image 150. In some embodiments, the server 160 may be implemented by a cluster of computing devices, such as virtual machines. For example, the server 160 may be implemented by a plurality of computing devices using distributed computing and/or cloud computing systems in a network. In some embodiments, the server 160 may be configured to provide services and resources (e.g., data and/or hardware resources as described herein, etc.) to other components and devices.

The server 160 may comprise a processor 162 operably coupled with a network interface 164 and a memory 166. The processor 162 comprises one or more processors. The processor 162 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 162 may be a programmable logic device, a microcontroller, a microprocessor, or any suitable number and combination of the preceding. The one or more processors are configured to process data and may be implemented in hardware or software. For example, the processor 162 may be 8-bit, 16-bit, 32-bit, 64-bit, or of any other suitable architecture. The processor 162 may include an ALU for performing arithmetic and logic operations. The processor 162 may register the supply operands to the ALU and store the results of ALU operations. The processor 162 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 168) to perform the operations of the server 160 described herein. In this way, the processor 162 may be a special-purpose computer designed to implement the functions disclosed herein. In an embodiment, the processor 162 is implemented using logic units, FPGAs, ASICs, DSPs, or any other suitable hardware. The processor 162 is configured to operate as described in FIGS. 1-3. For example, the processor 162 may be configured to perform one or more operations of the operational flow 200 as described in FIG. 2 and one or more operations of the method 300 as described in FIG. 3.

The network interface 164 is configured to enable wired and/or wireless communications. The network interface 164 may be configured to communicate data between the server 160 and other devices, systems, or domains. For example, the network interface 164 may comprise an NFC interface, a Bluetooth interface, a Zigbee interface, a Z-wave interface, a RFID interface, a WIFI interface, a LAN interface, a WAN interface, a MAN interface, a PAN interface, a WPAN interface, a modem, a switch, and/or a router. The processor 162 may be configured to send and receive data using the network interface 164. The network interface 164 may be configured to use any suitable type of communication protocol.

The memory 146 may be a non-transitory computer-readable medium. The memory 146 may be volatile or non-volatile and may comprise ROM, RAM, TCAM, DRAM, and/or SRAM. The memory 146 may include one or more of a local database, a cloud database, a NAS, etc. The memory 146 comprises one or more disks, tape drives, or solid-state drives, and may be used as an overflow data storage device, to store programs when such programs are selected for execution, and to store instructions and data that are read during program execution. The memory 146 may store any of the information described in FIGS. 1-3 along with any other data, instructions, logic, rules, or code operable to implement the function(s) described herein when executed by processor 162. For example, the memory 146 may store data packet 104, encoding algorithm 152, compression algorithm 154, CIDs 236, image generating algorithm 156, images 150, hash values 232, patterns 210, timestamps 234, compression level 158, metadata 170, software instructions 168, metadata generating algorithm 172, and/or any other data or instructions. The software instructions 168 may comprise any suitable set of instructions, logic, rules, or code operable to execute the processor 162 and perform the functions described herein, such as some or all of those described in FIGS. 1-3.

The encoding algorithm 152 may be implemented by the processor 162 executing the software instructions 168, and is generally configured to encode each data packet 104 into a respective encoded value, where the encoded value may represent a unique transformation of the respective data packet. In some embodiments, the encoding algorithm 152 may include a pliable multiscale encoding (PME) algorithm that builds upon the principles of multiscale encoding which represents a significant advancement in the field of data encoding, offering a more flexible, scalable, and effective approach to handling and analyzing large and complex datasets. For example, the encoding algorithm 152 may encode data packets 104 by identifying self-similar patterns 210 within the data packets 104 and representing them using a multiscale formula, such as: $F(x)=a.x^n+b.x+c$, where F (x) represents the fractal pattern, x values represent the data packets 104, and the a, b, c, and n values are constants that define the specific shape and characteristics of the fractal formula. Each value x may be a numerical representation of the respective data packet 104. For example, the polynomial formula may be used to encode the self-similar patterns 210 in the data packets 104.

The compression algorithm 154 may be implemented by the processor 162 executing the software instructions 168 and is generally configured to compress the data packets 104 into a compressed format. In some embodiments, the compression algorithm 154 may be implemented by a recursive similarity compression (RSC) algorithm where compression algorithm 154 may determine data patterns within patterns on data packets 104. In this process, the compression algorithm 154 may identify smaller parts of the data packets 104 that resemble the larger whole, and this process is repeated at multiple levels or scales. By identifying these recursive self-similar patterns 210, the compression algorithm 154 may compress the data packets 104 even further due to the use of same multiscale formula to represent larger and smaller parts of the data packets 104, reducing the amount of information needed to describe the entire dataset of the data packets 104. Thus, the compression algorithm 154 may result is a higher compression ratio, meaning the compressed data packets 104 may take even less memory space while still retaining the essential information. This makes it more efficient to store and transmit the data packets 104 as they require less memory space and network bandwidth.

The image generating algorithm 156 may be implemented by the processor 162 executing the software instructions 148 and is generally configured to generate images 150 where the pixels 228 represent the associated data packets 104. In some embodiments, the image generating algorithm 156 may comprise determine pixel attributes 226 of each pixel 228 of an image 150 based on predefined rules that map each pixel attribute 226 to a respective data packet attribute 224. For example, the pixel attributes 226, including pixel color, color intensity, and location may be mapped to each respective data packet attribute 224, and this information may be used to form the respective pixel 228. The arrangement of the pixels 228 may form the image 150. The image generating algorithm 156 may perform similar operations for other data packets 104, generate pixels representing the data packets 104, and generate an image 150 of the generated pixels, where each pixel corresponds to a respective data packet 104 (which may be encoded and compressed), and the pixel attributes 226 visually encode and represent the data packet attributes 224 of the data packet 104.

The metadata generating algorithm 172 may be implemented by the processor 162 executing the software instructions 168, and is generally configured to generate electronic records for images 150 based on hash value 232 and CID 236 of each given image 150 in a predefined structured data format 246. The structured data format 246 may be XML, JSON, among others. In some embodiments, the metadata generating algorithm 172 may be implemented by rule-based programming language, object-oriented programming language, and/or machine learning techniques. For example, the metadata generating algorithm 172 may be implemented by supervised or semi-supervised machine learning methods, such as neural networks or decision trees, trained to generate structured metadata 170 from unstructured inputs (e.g., hash values 232, CIDs 236, and image properties, such as pixel attributes 226). The metadata generating algorithm 172 may parse the given input to identify its content, such as text, digits, or other data types. In response, the metadata generating algorithm 172 may convert the raw input into a structured format to label or designate each element in the identified content with a respective header as a descriptive identifier.

In the example of the rule-based programming language and object-oriented programming language, the metadata generating algorithm 172 may be configured to process a given input (e.g., a hash value 232 and/or CID 236) and recognize its content as a combination of certain characters. In response, the metadata generating algorithm 172 may generate a structured representation, such as a JSON key-value pair or an XML element, where the header describes the content type (e.g., "hash" or "CID") and the value represents the respective input. For example, based on predefined rules or logic that indicate a pattern of thirty-two hexadecimal characters is a hash value, if the first input has a pattern of thirty-two hexadecimal characters, the metadata generating algorithm 172 may determine that the first input is a hash value 232. In another example, based on predefined rules or logic that indicates a pattern of sixteen alphanumeric characters is a CID, if the second input has a pattern of sixteen alphanumeric characters, the metadata generating algorithm 172 may determine that the second input is a CID 236. In response, the metadata generating algorithm 172 may designate structured elements to each input, for example, as an XML element, a JSON key-value pair, etc.

In some embodiments, the metadata generating algorithm 172 may generate the metadata 170 in a particular structured format based on the content of the image 150, which may be unstructured. For example, the metadata generating algorithm 172 may analyze the unstructured content of the image 150 (e.g., pixel attributes 226, etc.) and classify or categorize these elements based on their respective characteristics. Based on analyzing and parsing the determined content of the image 150, the metadata generating algorithm 172 may identify the corresponding hash value 232 and the CID 236. In response, the metadata generating algorithm 172 may generate the metadata 170 for the hash value 232 and the CID 236 in the desired data format, similar to that described herein.

In the example of machine learning methods, the metadata generating algorithm 172 may be trained by a training dataset that comprises a set of annotated or labeled unstructured input (e.g., hash values 232 and CIDs 236), each labeled with respective header designation. The metadata generating algorithm 172 may feed at least a portion of the training dataset to its neural network to extract and learn the patterns of each input and associate each pattern to its respective header designation (e.g., "hash" or "CID"). The pattern may include the structure, format, and content characteristics (text, numbers, etc.) of the given input. In the testing phase, the metadata generating algorithm 172 may be given an unlabeled unstructured input and asked to determine its descriptive header designation. In response, metadata generating algorithm 172 may implement the learned associations from the training process to analyze the testing input and identify its pattern. For example, if the metadata generating algorithm 172 is presented with an alphanumeric string in a pattern consistent with a hash value as determined during the training process, the metadata generating algorithm 172 may designate the header as "hash".

Operational Flow for Managing Images in a Decentralized File System Based on Image Metadata in a Blockchain FIG. 2 illustrates an example operational flow 200 of the system 100 (see FIG. 1) for managing images 150 in a decentralized file system 140 based on image metadata 170 in a blockchain. In operation, the server 160 may receive a plurality of data packets 104 from different data sources 202. For example, the data sources 202 may include and/or be associated with the computing devices 120. In some embodiments, the server 160 may act as a gateway device that monitors and accesses data packets 104 as they are communicated in a network 110 among computing devices 120. In response, the server 160 may access and process them as described herein.

Encoding and Compressing Data Packets

In some embodiments, in response to accessing the data packets 104, the server 160 may implement the encoding algorithm 152 to encode each data packet 104, similar to that described in FIG. 1. For example, the encoding algorithm 152 may convert the data packet 104a into the encoded value 218a and the data packet 104b into the encoded value 218b. Each encoded value 218a-b may be a unique transformation of the respective data packet 104a-b.

In some embodiments, the server 160 may compress the encoded data packets 104a-b (e.g., encoded values 218a-b) by implementing the compression algorithm 154, similar to that described in FIG. 1. In this process, the compression algorithm 154 may identify each group of encoded data packets 104 (e.g., encoded values 218) that share a data pattern 210. In response, the compression algorithm 154 may compress each group of encoded data packets 104 (e.g., encoded values 218) that share a common data pattern 210.

In some embodiments, the compression process by the compression algorithm 154 may be recursive. The level of the recursive compression process may be set by the dynamic threshold compression level 158. For example, if the compression level 158 is set to two, the compression algorithm 154 may perform two levels of recursive compression, where at a first level, the compression algorithm 154 identifies and compresses repeating structures across the encoded data packet 104 to generate a compressed data 220*a*, and at a second level, the compression algorithm 154 identifies and compresses repeating structures within the compressed data 220*a* to generate the compressed data 220*b*. The compression level 158 may be any suitable number based on the system design and compression configuration.

Generating Images for the Data Packets

In some embodiments, the server 160 may implement the image generating algorithm 156 to generate images 150 for the encoded and compressed data packets 104 (e.g., the encoded and compressed data 220*b*). The encoded and compressed data packets 104 may be the output of the encoding algorithm 152 and the compression algorithm 154. In some embodiments, the encoded and compressed data packets 104 may be partitioned to be represented by multiple images 150. For example, the encoded and compressed data packets 104 may be divided into groups of fifty, one hundred, five hundred, etc. and each group may be represented by a different image 150. In the example of FIG. 2, each of the images 150*a* and 150*b* is a visual representation of the respective encoded and compressed data packets 104 generated by the image generating algorithm 156.

In generating each image 150 (e.g., any of images 150*a* and 150*b*), the image generating algorithm 156 may determine a set of attributes 224 for each encoded and compressed data packet 104, where the attributes 224 include type, content, timestamp of communication, data structure, and network path. In response, the image generating algorithm 156 may use the attributes 224 to determine respective pixel attributes 226 to visually encode or embed each attribute 224 into a respective pixel based on predefined rules. The pixel attributes 226 may include pixel color, color intensity, and pixel location within an image 150. For example, the type of data packet 104 may be embedded or reflected as the type of the data packet 104 in the respective pixel 228, the content value of the data packet 104 may be embedded or reflected as a pixel color intensity in the respective pixel 228, and the timestamp of the data packet 104 may be embedded or reflected as the pixel location, where the x-axis (of the respective image 150) represents the timestamp and the y-axis (of the respective image 150) represents the type of the data packet 104.

In response to determining the pixel attributes 226 of each pixel 228, the image generating algorithm 156 may assemble the pixels 228 to generate the respective image 150. For example, the pixel 228*a* may be generated based on the pixel attributes 226*a* which are determined based on the attributes 224*a* of the data packet 104*a*, and the pixel 228*b* may be generated based on the pixel attributes 226*b* which are determined based on the attributes 224*b* of the data packet 104*b*. The pixels 228*a*, 228*b* and other pixels among them may be compiled to form the image 150*a*. The server 160 may perform similar operations to generate other images, such as the image 150*b*. The images 150 may be accessed and viewed on the display screens of any computing device, such as the server 160 and computing devices 120.

Generating Image Metadata

In response to generating an image 150, the server 160 may generate image metadata 170 for each image 150 by implementing the metadata generating algorithm 172. To this end, the server 160 (e.g., via the metadata generating algorithm 172) may generate the hash value 230 and CID 236 for each image 150. To generate the hash value 232 for an image 150, the server 160 (e.g., via the metadata generating algorithm 172) may determine a timestamp 234 that indicates when one or more respective data packets 104 (represented by the image 150) were communicated in the network and the compression level 158 associated with the one or more respective data packets 104 that was used to indicate the number of levels to identify repeating structures within the one or more respective data packets 104 in the recursive compression process of the compression algorithm 154. The hash value 232 may represent a unique digital fingerprint of the combination of the determined timestamp 234 and the determined compression level 158. For example, the timestamp 234 may indicate one or more calendar dates and times of day that one or more data packets 104 were communicated in the network from one computing device 120 to another computing device 120. In examples where multiple data packets 104 are being evaluated, the timestamp 234 may be an average of the data packets 104. In some examples, the compression level 158 may be one, two, three, or any number. In this example, the metadata generating algorithm 172 may feed the given timestamp 234 and compression level 158 to a hash function (e.g., secure hash algorithm (SHA)-256, etc.) to generate the hash value 232 based on the given timestamp 234 and the compression level 158. The generated hash value 232 may uniquely represent the combination of the timestamp 234 and compression level 158 for the corresponding image 150.

To generate the CID 236 for an image 150, the server 160 (e.g., via the metadata generating algorithm 172) may use the content 240 within the one or more respective data packets 104 represented by the image 150. In this process, in some embodiments, the metadata generating algorithm 172 may parse the data packet(s) 104 to extract the content 240, including headers, text, payload, among others, and label each element within the content 240 with its corresponding identifier, such as header, payload, etc. In response, the metadata generating algorithm 172 may feed the content 240 to a cryptographic hash function (e.g., SHA-256, etc.) to generate a CID 236 based on the given content 240. Because the CID 236 is derived from the content 240, any change to the content 240 may result in a different CID 236.

In some embodiments, the metadata generating algorithm 172 may analyze the image 150 to extract the unstructured content 240 from the image 150, e.g., by an image processing algorithm. In this process, the metadata generating algorithm 172 may determine the pixel attributes 226 of the pixels 228 within the image 150 and use the pixel attributes 226 to generate the CID 236 for the corresponding image 150. For example, the metadata generating algorithm 172 may group the pixels 228 with corresponding pixel attributes 226 and feed each group of pixels 228 to a cryptographic hash function serially to generate the CID 236 for the image 150.

In some embodiments, the CID 236 may include a location data 242 associated with the respective image 150 within the decentralized file system 140. For example, the server 160 may include in a CID 236 a different location data 242 in a memory of a network node 141 where the respective image 150 is to be stored. The location data 242 associated with the CID 236 may comprise or indicate a reference to a directory address 244 within the decentralized file system 140 where the respective image 150 is stored.

The server 160 (e.g., via the metadata generating algorithm 172) may generate the metadata 170 for the image 150 based on the respective generated hash value 232 and the generated CID 236. The generated metadata 170 may represent the respective generated hash value 232 and the generated CID 236 in a structured data format 246. In this process, the metadata generating algorithm 172 (e.g., via neural networks and/or objected oriented programming language) may designate each member of the metadata 170 (including the generated hash value 232 and the generated CID 236) to a data structure parameter, such as an element in an XML file, a key-value pair in JSON, etc.

For example, in some embodiments where the structured data format 246 is JSON, the metadata generating algorithm 172 may designate the generated hash value 232 and CID 236 to respective key-value pairs, where the first key-value pair may be created for the hash value 232, where the key is a header (e.g., "hash value") that represents text that identifies the hash value 232 and the value is the generated hash value 232, and the second key-value pair may be created for the CID 236, where the key is a descriptive header (e.g., "CID") that represents text that identifies the CID 236 and the value is the generated CID 236.

In some embodiments where the structured data format 246 is XML, the metadata generating algorithm 172 may designate the hash value 232 and CID 236 to respective XML elements. For example, the first XML element may represent the hash value 232, where the first XML element comprises a first tag and a first value, where the first tag (e.g., <Hash Value>) identifies the hash value 232 and the first value comprises the hash value 232, and the second XML element comprises a second tag and a second value, where the second tag (e.g., <CID>) identifies the CID 236 and the second value comprises the CID 236. The present disclosure is not limited to these data structures and the metadata 170 may be in any other data structure, such as Binary JSON, etc. The server 160 may perform similar operations to generate metadata 170 for any given image 150. For example, the server 160 may generate the metadata 170a for the image 150a based on the hash value 232a and CID 236a generated for the image 150a, and generate the metadata 170b for the image 150b based on the hash value 232b and CID 236b generated for the image 150b.

In response to generating the metadata 170 for an image 150, the server 160 may associate the generated metadata 170 to the respective image 150. The metadata 170 may be used for identifying the hash value 232 and/or the CID 236 of the respective image 150. The server 160 may communicate the metadata 170 of the image 150 to a block in a blockchain network 130, where the block may be within the blockchain 136. Additionally, the server 160 may communicate the image 150 to the decentralized file system 140 to be stored. Each image 150 may be stored in a respective directory address 244 in a memory 146 of a network node as indicated based on the respective CID 236. In some embodiments, the server 160 may encrypt the image 150 using an encryption algorithm and a predefined encryption key before communicating the encrypted image 150 to the decentralized file system 140 to be stored.

The server 160 may implement access control for the images 150 for authorized users 102. For example, the server 160 may maintain a list of authorized users 102 in its memory. When a request 106 to access an image 150 is received at the server 160, the server 160 may determine whether request 106 is from an authorized user 102 by referencing the list of authorized users 102 for each image 150, checking the credentials of the user 102, among other security protocols.

Image Retrieval Process

In an example scenario, assume that a user wants to access an image 150 stored in the decentralized file system 140. In response, the user may initiate a request 106 to the server 160 to retrieve the image 150. In response to receiving the request 106, the server 160 may determine whether the user 102 is authorized to access the image 150 by referencing the list of authorized users 102 for the image 150. If it is determined that the request 106 is from an authorized user 102, the server 160 may proceed to grant the request 106. The request 106 may include input parameters, including a hash value 108 for a requesting image 150.

In response to receiving the request 106, the server 160 may determine whether there is any metadata 170 that comprises the hash value 108 stored in the blockchain network 130. To this end, the server 160 may execute a search query at the blockchain network 130 to return metadata 170 that includes the hash value 108. If the search query returns metadata 170 that includes the hash value 108, the server 160 may analyze the retrieved metadata 170 to determine whether it corresponds to or associated with the requested image 150. To this end, the server 160 may compare the hash value 108 to the hash value 232 previously included in the metadata 170. If the server 160 determines that the hash value 108 corresponds with the hash value 232, the server 160 may extract the CID 236 from the metadata 170. Based on the CID 236, the server 160 may identify the location of the requested image 150 within the decentralized file system 140 (e.g., the directory address 244 as indicated by the CID 236).

In some embodiments, if the server 160 determines that the hash value 108 corresponds with the hash value 232, the server 160 may execute a smart contract stored in the blockchain network 130 to verify whether the request 106 is from an authorized user 102 based on the list of authorized users 102 for the image 150. When the smart contract is executed, the server 160 may determine the content of the metadata 170 and extract the CID 236 from the metadata 170.

In response to determining the location of the image 150, the server 160 may retrieve the image 150 from the decentralized file system 140. In some embodiments, the server 160 may decrypt the retrieved image 150 using a decryption key if the image 150 is stored in an encrypted format. After retrieving the image 150, the server 160 may communicate the image 150 to the computing device 120 from which the request 106 was received.

Method for Managing Images in a Decentralized File System Based on Image Metadata in a Blockchain FIG. 3 illustrates an example flowchart of a method 300 for managing images 150 in a decentralized file system 140 based on image metadata 170 in a blockchain, according to some embodiments. Modifications, additions, or omissions may be made to method 300. Method 300 may include more, fewer, or other operations. For example, operations may be performed in parallel or in any suitable order. While at times it is discussed that the system 100, computing devices 120, server 160, or components of any of thereof perform some operations, any suitable system or components of the system may perform one or more operations of the method 300. For example, one or more operations of method 300 may be implemented, at least in part, in the form of software instructions 168 of FIG. 1, stored on a tangible non-transitory machine-readable medium (e.g., memory 166 of FIG. 1)

that when run by one or more processors (e.g., processor 162 of FIG. 1) may cause the one or more processors to perform operations 302-322.

At operation 302, the server 160 may access a plurality of images 150. For example, the server 160 may access the images 150 generated based on the data packets 104, similar to that described in FIGS. 1-2.

At operation 304, the server 160 may select an image 150 from among the plurality of images 150. The server 160 may iteratively select an image 150 if at least one image 150 is left for evaluation.

At operation 306, the server 160 may determine a timestamp 234 that indicates when the data packets 104 associated with the image 150 were communicated in a network 110, similar to that described in FIGS. 1-2.

At operation 308, the server 160 determines a compression level 158 associated with the data packet 104, similar to that described in FIGS. 1-2.

At operation 310, the server 160 generates a hash value 232 for the image 150 based on the determined timestamp 234 and the determined compression level 158, similar to that described in FIGS. 1-2.

At operation 312, the server 160 generates a CID 236 for the image 150 based on the content 240 of the data packets 104 (or content 240 of the image 150), similar to that described in FIGS. 1-2.

At operation 314, the server 160 generates metadata 170 for the image 150, that represents the hash value 232 and the CID 236 in a structured format 246, similar to that described in FIGS. 1-2.

At operation 316, the server 160 associates the metadata 170 to the image 150, similar to that described in FIGS. 1-2.

At operation 318, the server 160 communicates the metadata 170 to the blockchain network 130, similar to that described in FIGS. 1-2.

At operation 320, the server 160 communicates the image 150 to the decentralized file system 140, similar to that described in FIGS. 1-2.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. To aid the Patent Office, and any readers of any patent issued on this application in interpreting the claims appended hereto, applicants note that they do not intend any of the appended claims to invoke 35 U.S.C. § 112 (f), as it exists on the date of filing hereof, unless the words "means for" or "step for" are explicitly used in the particular claim.

The invention claimed is:

1. A system comprising:

a memory configured to store one or more images, wherein:

a first image from among the one or more images comprises a plurality of pixels visually representing a plurality of data packets; and each pixel from among the plurality of pixels represents a respective one or more data packet; and a processor, operably coupled to the memory, and configured to:

determine a timestamp that indicates when the plurality of data packets was communicated in a network;

in a recursive compression process:

at a first level, identify a first repeating structure across the plurality of data packets;

generate a first compressed data by compressing data with the first repeating structure across the plurality of data packets;

at a second level, identify a second repeating structure within the first compressed data; and generate a second compressed data by compressing data with the second repeating structure within the first compressed data;

determine a compression level associated with the plurality of data packets via the recursive compression process, wherein the compression level indicates a number of levels used to identify repeating structures within the plurality of data packets;

determine a respective set of pixel attributes for a given data packet of the plurality of data packets based at least in part upon a predefined rule that maps each attribute of a set of attributes of the given data packet to a respective pixel attribute, wherein:

the set of attributes comprises at least one of content of the given data packet, the timestamp, and a data structure of the given data packet; and the predefined rule maps the content of the given data packet to a respective pixel color intensity, and maps the timestamp of the given data packet to a respective pixel location;

generate a plurality of pixels based at least in part upon the determined respective set of pixel attributes;

assemble the generated plurality of pixels to form the first image;

generate a first hash value for the first image based at least in part upon the determined timestamp and the determined compression level, wherein the generated first hash value represents a combination of the determined timestamp and the determined compression level;

generate a first unique content identifier (CID) for the first image based at least in part upon content within the plurality of data packets, wherein the first CID indicates a location data associated with the first image within a decentralized file system:

generate a first metadata for the first image, wherein the generated first metadata represents the generated first hash value and the generated first CID in a structured data format;

associate the generated first metadata to the first image;

communicate the generated first metadata to a block in a blockchain network; and communicate the first image to the decentralized file system.

2. The system of claim 1, wherein the processor is further configured to:

receive a request to retrieve the first image, wherein the request comprises at least one input parameter comprising a second hash value;

in response to receiving the request:

determine whether there is any metadata that comprises the second hash value stored in the blockchain network;

determine that the first metadata comprises the first hash value that corresponds with the second hash value;

identify the first CID comprised within the first metadata;

identify a location of the first image using the identified first CID within the decentralized file system;

retrieve the first image; and communicate the first image to a computing device from which the request is received.

3. The system of claim 1, wherein the structured data format comprises JavaScript object notation (JSON) or extensible markup language (XML).

4. The system of claim 1, wherein:

the structured data format comprises JavaScript object notation (JSON); and the generating the first metadata for the first image in the JSON data format, comprises:

designating a first key-value pair within the first metadata to the first hash value, wherein:

the first key-value pair comprises a first header and a first value:

the first header represents text that identifies the first hash value; and the first value comprises the first hash value; and designating a second key-value pair within the first metadata to the first CID, wherein:

the second key-value pair comprises a second header and a second value;

the second header represents text that identifies the first CID; and the second value comprises the first CID.

5. The system of claim 1, wherein:

the structured data format comprises extensible markup language (XML); and the generating the first metadata for the first image in the XML data format, comprises:

designating a first XML element within the first metadata to represent the first hash value, wherein:

the first XML element comprises a first tag and a first value:

the first tag identifies the first hash value; and the first value comprises the first hash value; and designating a second XML element within the first metadata to represent the first unique content identifier (CID), wherein:

the second XML element comprises a second tag and a second value;

the second tag identifies the first CID; and the second value comprises the first CID.

6. The system of claim 1, wherein the generating the first metadata for the first image comprises transforming each of the first hash value and the first CID from a data structure that is not compatible with a receiving computing device into the structured data format.

7. The system of claim 1, wherein the location data associated with first CID comprises a reference to a directory within the decentralized file system where the first image is stored.

8. A method comprising:

determining a timestamp that indicates when a plurality of data packets was communicated in a network;

in a recursive compression process:

at a first level, identifying a first repeating structure across the plurality of data packets;

generating a first compressed data by compressing data with the first repeating structure across the plurality of data packets;

at a second level, identifying a second repeating structure within the first compressed data; and generating a second compressed data by compressing data with the second repeating structure within the first compressed data;

determining a compression level associated with the plurality of data packets via the recursive compression process, wherein the compression level indicates a number of levels used to identify repeating structures within the plurality of data packets;

determining a respective set of pixel attributes for a given data packet of the plurality of data packets based at least in part upon a predefined rule that maps each attribute of a set of attributes of the given data packet to a respective pixel attribute, wherein:

the set of attributes comprises at least one of content of the given data packet, the timestamp, and a data structure of the given data packet; and the predefined rule maps the content of the given data packet to a respective pixel color intensity, and maps the timestamp of the given data packet to a respective pixel location;

generating a plurality of pixels based at least in part upon the determined respective set of pixel attributes;

assembling the generated plurality of pixels to form the first image;

generating a first hash value for a first image based at least in part upon the determined timestamp and the determined compression level, wherein the generated first hash value represents a combination of the determined timestamp and the determined compression level;

generating a first unique content identifier (CID) for the first image based at least in part upon content within the plurality of data packets, wherein the first CID indicates a location data associated with the first image within a decentralized file system;

generating a first metadata for the first image, wherein the generated first metadata represents the generated first hash value and the generated first CID in a structured data format;

associating the generated first metadata to the first image;

communicating the generated first metadata to a block in a blockchain network; and communicating the first image to the decentralized file system.

9. The method of claim 8, further comprising receiving a request to retrieve the first image, wherein the request comprises at least one input parameter comprising a second hash value;

in response to receiving the request:

determining whether there is any metadata that comprises the second hash value stored in the blockchain network;

determining that the first metadata comprises the first hash value that corresponds with the second hash value:

identifying the first CID comprised within the first metadata;

identifying a location of the first image using the identified first CID within the decentralized file system;

retrieving the first image; and communicating the first image to a computing device from which the request is received.

10. The method of claim 8, wherein the structured data format comprises JavaScript object notation (JSON) or extensible markup language (XML).

11. The method of claim 8, wherein:

the structured data format comprises JavaScript object notation (JSON); and the generating the first metadata for the first image in the JSON data format, comprises:

designating a first key-value pair within the first metadata to the first hash value, wherein:

the first key-value pair comprises a first header and a first value:

the first header represents text that identifies the first hash value; and the first value comprises the first hash value; and designating a second key-value pair within the first metadata to the first CID, wherein:

the second key-value pair comprises a second header and a second value;

the second header represents text that identifies the first CID; and the second value comprises the first CID.

12. The method of claim 8, wherein:

the structured data format comprises extensible markup language (XML); and the generating the first metadata for the first image in the XML data format, comprises:

designating a first XML element within the first metadata to represent the first hash value, wherein:

the first XML element comprises a first tag and a first value;

the first tag identifies the first hash value; and the first value comprises the first hash value; and designating a second XML element within the first metadata to represent the first unique content identifier (CID), wherein:

the second XML element comprises a second tag and a second value:

the second tag identifies the first CID; and the second value comprises the first CID.

13. The method of claim 8, wherein the generating the first metadata for the first image comprises transforming each of the first hash value and the first CID from a data structure that is not compatible with a receiving computing device into the structured data format.

14. The method of claim 8, wherein the location data associated with first CID comprises a reference to a directory within the decentralized file system where the first image is stored.

15. A non-transitory computer-readable medium storing instructions that, when executed by a processor, causes the processor to:

determine a timestamp that indicates when a plurality of data packets was communicated in a network;

in a recursive compression process:

at a first level, identify a first repeating structure across the plurality of data packets;

generate a first compressed data by compressing data with the first repeating structure across the plurality of data packets;

at a second level, identify a second repeating structure within the first compressed data; and generate a second compressed data by compressing data with the second repeating structure within the first compressed data;

determine a compression level associated with the plurality of data packets via the recursive compression process, wherein the compression level indicates a number of levels used to identify repeating structures within the plurality of data packets;

determine a respective set of pixel attributes for a given data packet of the plurality of data packets based at least in part upon a predefined rule that maps each attribute of a set of attributes of the given data packet to a respective pixel attribute, wherein:

the set of attributes comprises at least one of content of the given data packet, the timestamp, and a data structure of the given data packet; and the predefined rule maps the content of the given data packet to a respective pixel color intensity, and maps the timestamp of the given data packet to a respective pixel location;

generate a plurality of pixels based at least in part upon the determined respective set of pixel attributes;

assemble the generated plurality of pixels to form the first image;

generate a first hash value for a first image based at least in part upon the determined timestamp and the determined compression level, wherein the generated first hash value represents a combination of the determined timestamp and the determined compression level;

generate a first unique content identifier (CID) for the first image based at least in part upon content within the plurality of data packets, wherein the first CID indicates a location data associated with the first image within a decentralized file system;

generate a first metadata for the first image, wherein the generated first metadata represents the generated first hash value and the generated first CID in a structured data format;

associate the generated first metadata to the first image;

communicate the generated first metadata to a block in a blockchain network; and communicate the first image to the decentralized file system.

16. The non-transitory computer-readable medium of claim 15, wherein the instructions further cause the processor to:

receive a request to retrieve the first image, wherein the request comprises at least one input parameter comprising a second hash value;

in response to receiving the request:

determine whether there is any metadata that comprises the second hash value stored in the blockchain network;

determine that the first metadata comprises the first hash value that corresponds with the second hash value:

identify the first CID comprised within the first metadata;

identify a location of the first image using the identified first CID within the decentralized file system;

retrieve the first image; and communicate the first image to a computing device from which the request is received.

17. The non-transitory computer-readable medium of claim 15, wherein the structured data format comprises JavaScript object notation (JSON) or extensible markup language (XML).

18. The non-transitory computer-readable medium of claim 15, wherein:

the structured data format comprises JavaScript object notation (JSON); and the generating the first metadata for the first image in the JSON data format, comprises:

designating a first key-value pair within the first metadata to the first hash value, wherein:

the first key-value pair comprises a first header and a first value;

the first header represents text that identifies the first hash value; and the first value comprises the first hash value; and designating a second key-value pair within the first metadata to the first CID, wherein:

the second key-value pair comprises a second header and a second value;

the second header represents text that identifies the first CID; and the second value comprises the first CID.

19. The non-transitory computer-readable medium of claim 15, wherein:

the structured data format comprises extensible markup language (XML); and the generating the first metadata for the first image in the XML data format, comprises:

designating a first XML element within the first metadata to represent the first hash value, wherein:

the first XML element comprises a first tag and a first value;

the first tag identifies the first hash value; and the first value comprises the first hash value; and designating a second XML element within the first metadata to represent the first unique content identifier (CID), wherein:

the second XML element comprises a second tag and a second value:

the second tag identifies the first CID; and the second value comprises the first CID.

20. The non-transitory computer-readable medium of claim 15, wherein the first hash value represents a unique digital fingerprint of the combination of the determined timestamp and the determined compression level.

* * * * *